United States Patent [19]

Fascenda et al.

[11] Patent Number: 4,592,546
[45] Date of Patent: Jun. 3, 1986

[54] GAME OF SKILL PLAYABLE BY REMOTE PARTICIPANTS IN CONJUNCTION WITH A LIVE EVENT

[75] Inventors: Anthony C. Fascenda, Pacifica, Calif.; David B. Lockton, 97 Hawthorne Dr., Atherton, Calif. 94025

[73] Assignee: David B. Lockton, Atherton, Calif.

[21] Appl. No.: 604,145

[22] Filed: Apr. 26, 1984

[51] Int. Cl.⁴ ............................................. A63F 9/22
[52] U.S. Cl. ............................. 273/1 E; 273/138 A; 273/DIG. 28
[58] Field of Search .................... 273/DIG. 28, 138 A, 273/1 E; 371/34; 364/410–412

[56] References Cited

U.S. PATENT DOCUMENTS

| | | | |
|---|---|---|---|
| 3,810,627 | 5/1974 | Levy | 273/138 A |
| 3,910,322 | 10/1975 | Hardesty et al. | 371/34 |
| 3,964,179 | 6/1976 | Bennett | 434/219 |
| 4,339,798 | 7/1982 | Hedges et al. | 273/138 A |

FOREIGN PATENT DOCUMENTS 2120507  11/1983  United Kingdom ....... 273/DIG. 28

Primary Examiner—Richard C. Pinkham
Assistant Examiner—MaryAnn Stoll Lastora
Attorney, Agent, or Firm—Flehr, Hohbach, Test, Albritton & Herbert

[57] ABSTRACT

A game of skill is playable by several remote participants in conjunction with a live event, for example, a football game which is being observed by the participants on their television receivers. In the participant's remote location, a game console receives various game instructions and scoring information including the snap time, for example, of a football play via an FM subcarrier channel. Part of the data of this channel provides lockout information to prevent a play from being entered after the ball has been snapped. Scoring at the remote location is provided by a memory table at the remote location in association with degree of difficulty data which is transmitted via the FM system. In addition, a verification code or anti-cheating technique is provided by the use of several counters which are randomly started by counter start signals also transmitted over the FM system. After the live event, in a very short time interval, via telephone lines, all of the counter and scoring information is downloaded to a central computer to be checked, verified and final standings of all the various participants are computed.

7 Claims, 5 Drawing Figures

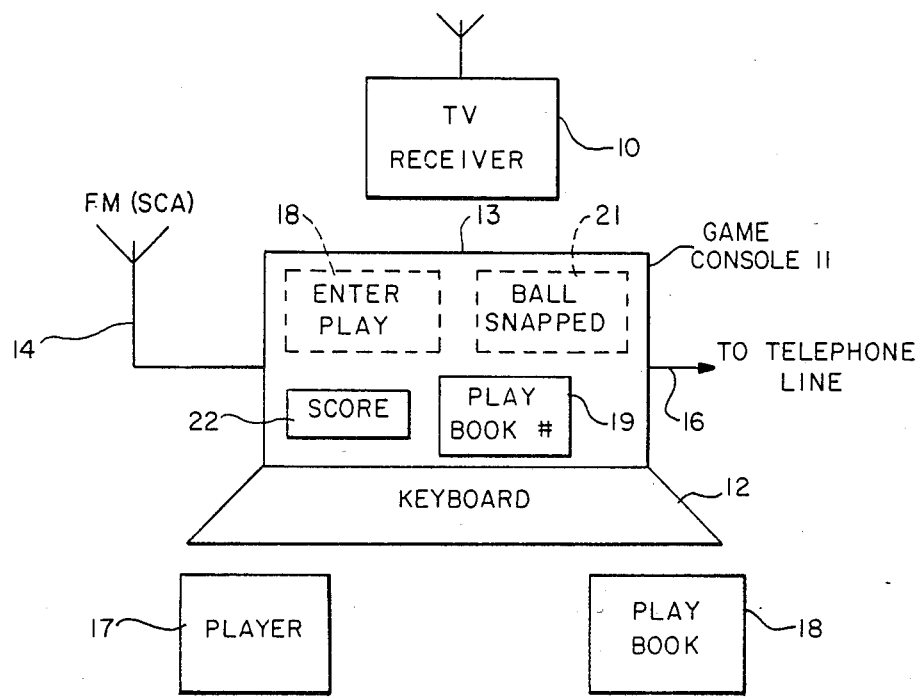
FIG.—1
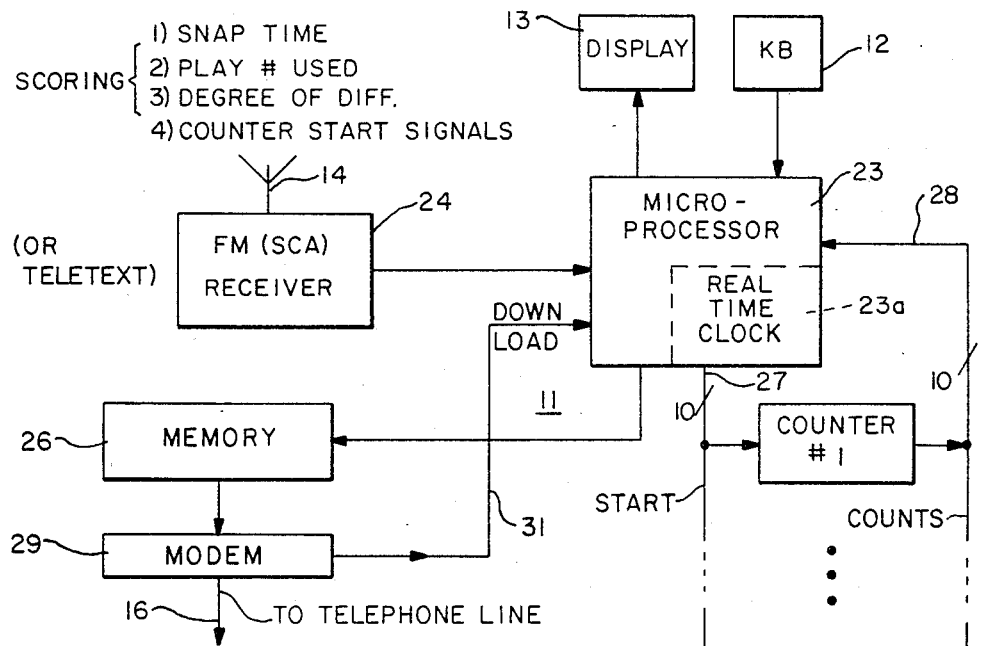
FIG.—2

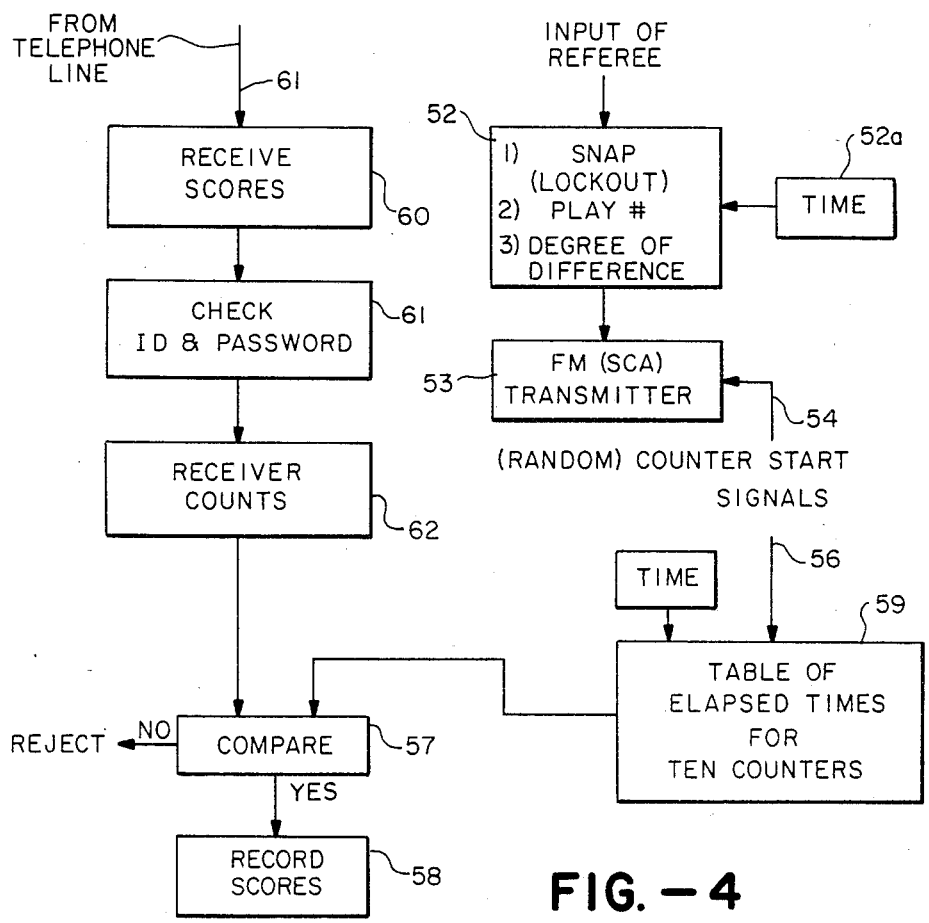
FIG.—4
TABLE OF ELAPSED TIMES
(AT 8 P.M. OR 20:00 hrs.)
| COUNTER NO. | XMITTED START TIMES | ELAPSED TIMES PRESENT ⊖ START |
|---|---|---|
| 1 | 11:00 a m | 9:00 hrs. |
| 2 | 11:23 | 8:37 |
| 3 | 11:31 | 8:29 |
| 4 | 11:44 | 8:16 |
| 5 | 12:01 | 7:59 |
| 6 | 12:02 | 7:58 |
| 7 | 12:15 | 7:45 |
| 8 | 12:35 | 7:25 |
| 9 | 12:55 | 7:05 |
| 10 | 13:23 | 7:37 |
FIG.—5

GAME OF SKILL PLAYABLE BY REMOTE PARTICIPANTS IN CONJUNCTION WITH A LIVE EVENT

BACKGROUND OF THE INVENTION

The present invention is directed to a game of skill playable by several remote participants in conjunction with a live event. More specifically, the event might be a football game viewed by the participants on their television receivers.

A remote gaming system involving gambling is disclosed in Hedges U.S. Pat. No. 4,339,798. Here the viewer may watch an actual game of Keno or Craps or Roulette in their hotel room on a T.V. monitor and by wired communications to the central casino place bets and accomplish other necessary transactions. One of the features of this system is that the croupier conducting the actual live game determines the time at which "no more bets" may be made which effectively locks out the player from entering his prediction as to the variable involved in the particular game. Thus, in summary, the main feature as discussed in this patent is allowing the player to participate in "wagering games from the convenience and privacy of his room at a casino or, for that matter, from a hotel or motel room remotely located from the casino".

Another U.S. Pat. No. 4,141,548 to Everton as inventor is for home use by a group of spectators watching, for example, a football game on a television receiver. Each player has a selector panel which includes a number of football play selection switches and these are directly wired to a master control unit. After the other players have made their selection of, for example, the kind of play and its outcome with their switches, a person at the control panel locks out any further predictions and then enters the actual results of the particular play in the control panel after it occurs. Then scoring occurs by comparing the participants' predictions with the actual occurrence. And these scores appear on the participants' score indicators. The Everton game is limited by the fact that only the participants viewing a single T.V. receiver in a single room of a residence may participate. Thus, it is not a remote gaming system as is true of the Hedges patent. On the other hand, the Hedges patent while offering remote gaming requires extensive wired communication between the remote location and the croupier station.

Thus, it is a general object of the present invention to provide an improved game of skill playable by several remote participants in conjunction with a live event.

SUMMARY OF THE INVENTION

In accordance with the above object, there is provided a game of skill playable by several remote participants in conjunction with a live event such as a football game which comprises first mass communications means for displaying or otherwise communicating the live event to the remote participants. Data storage means are associated with each participant for accepting from the participant at least one prediction as to a future variable of the event and for storing all predictions over substantially the life of the event. A second mass communication means connected to the data storage means serves the purpose of rendering ineffectual the participant's prediction if it is stored after the occurrence or determination of the particular variable of the event which is being predicted. Means are coupled to a telephone line for downloading, during a single very short time interval relative to the life of the event, contents of the data storage means to a central location.

BRIEF DESCRIPTION OF DRAWINGS

FIG. 1 is a block diagram of a game of skill showing apparatus which would be associated with one of the player participants.

FIG. 2 is a more detailed block diagram of a portion of FIG. 1.

FIG. 4 is a flow chart illustrating the operation of a central location of the game.

FIG. 5 is a table illustrating the operation of a portion of FIG. 4.

DETAILED DESCRIPTION OF PREFERRED EMBODIMENTS

Figure 3:
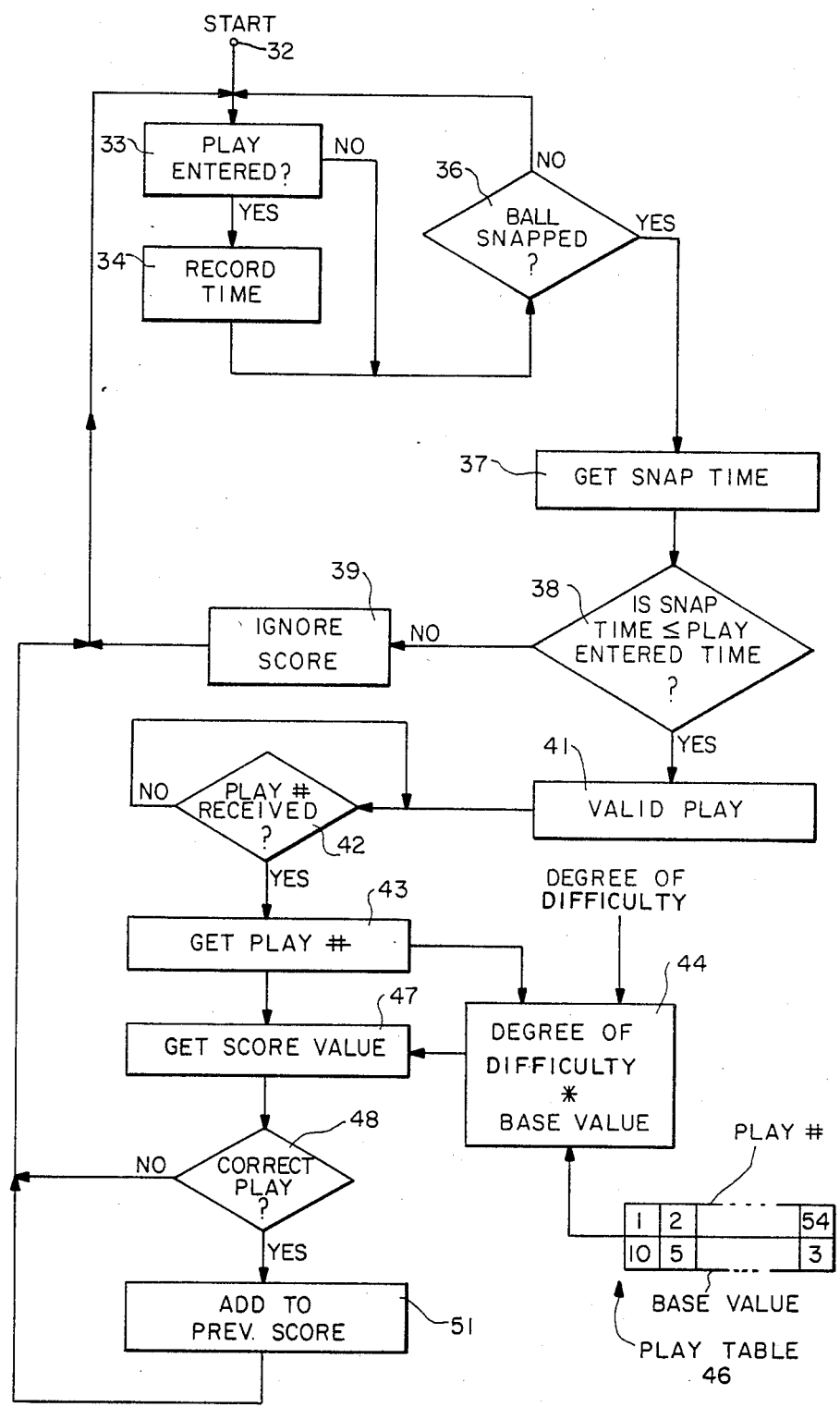
FIG. 3 is a flow chart illustrating the operation of FIG. 2.

FIG. 1 illustrates the apparatus required at the remote location of a participant of the game of skill. First, a T.V. receiver 10 would receive the live event such as a football game. Alternatively, of course, a radio or other means of mass communication could be used as long as it transmits the details of the event. A game console 11 includes a keyboard 12 and a display screen 13. In general, it receives control data via the SCA channel of an FM station via antenna 14. Data inputted into the keyboard, after being processed, is downloaded via the telephone line 16. The remote player participant is indicated at 17 along with, in the preferred embodiment dealing with a football game, a play book 18. In the play book, there would be various types of football plays such as quarterback roll-out or fullback plunge, each associated with various code numbers.

Very briefly, in operation, the game player watching the football game on the television receiver 10 would input a future predicted play by looking up the play in the play book 18 and inputting it on the keyboard 12. The display 13 of the game console 11 would advise, for example, to enter the play at 18 and when entered the specific number of the play in that play book would be shown at 19. Of course, when the ball is snapped, as indicated by the display 21, no play could be entered; that is, there would be a lock-out of this prediction and any attempted prediction after the ball snap time would be ineffectual. And then as will be described later, a scoring display 22 would also be provided so that the game players would immediately receive the results of their prediction.

Although the preferred embodiment is described in conjunction with predicting the play of a football game being shown on television, it is equally applicable to other live events such as other sports, television quiz games, or even a multiple choice test. The main feature of the present game is that the participant predicts a future variable of an event, enters that variable and when the event occurs, the player is psychologically motivated by being immediately scored on the prediction. And the game console's visual display 13 could, of course, have any number prompter readouts to aid in the playing of many different types of games.

FIG. 2 illustrates the game console 11 in a more detailed format and it includes as the main component a microprocessor 23. This has as an input the data from keyboard 12 and also data from antenna 14 which is converted to digital data by an FM (SCA) receiver 24.

The type of data in this particular embodiment which is carried by this mass communication technique is the snap time of the football (which is used for lock-out purposes to prevent further entry of plays), the play number used and the degree of difficulty of that particular play which is utilized for scoring the player's prediction, and lastly, various counter start signals which are to authenticate and/or verify the score and otherwise prevent cheating.

A memory 26 serves as data storage means to store the various inputs on the keyboard and finally the contents of the counters No. 1 through No. 10. These counters are controlled by the microprocessor 23 and serve as timers being driven by a real-time clock section 23a of the microprocessor. The 10 output lines 27 from the microprocessor individually and selectively start the counters and cause them to count up to maintain their respective elapsed times. Lines 28 carry the contents of the 10 counters which are stored in memory 26 when desired for immediate downloading to a central location.

Microprocessor 23 also drives the display unit 13 to provide visual prompts and various other features as discussed in conjunction with FIG. 1.

Memory 26 is connected to a modem 29 which in turn is connected to the telephone line connection 16. The user typically would activate the modem by dialing the telephone number of a central computer or central station and such activation indication would be carried on download line 31 indicating to microprocessor 23 that the present contents of the counters No. 1 through No. 10 are to be downloaded. Data downloaded in this relatively short time interval, relative to the time of the event or the football game, would be the total and by quarter scores achieved by the remote player participant because of their predictions, the participant's password and I.D. number and, of course, the real-time counts of the various counters. As will be discussed later, these real-time counts indicate the actual time the user or participant selects to telephone the central station for downloading of the memory 26 and the counters.

The password serves the purpose of ensuring that the authorized user is, for example, paid up on the monthly cost of the lease of the game equipment.

FIG. 3 is a flow chart illustrating how the microprocessor 23 of FIG. 2 receives the various inputs from the keyboard and from the FM receiver 24 which have been broadcast, processes them, maintains the proper order of the game and then provides the final data in memory 26 and the proper operation of the verification counters No. 1 through No. 10 for ultimate downloading. At the start point 32, decision step 33 is whether or not the participant has entered a play. If yes, the time of entry is recorded (block 34). Next, in step 36, the question is asked whether the ball has been snapped. This is determined by whether or not a snap time has been received. If not, another play may still be entered. If so, step 37 causes the snap time which was received to be gotten and this snap time is compared in step 38 to the play entered time. This is in essence the lockout feature which ensures that the play is entered before the snap time. If it is entered afterward, then the ignore score flag 39 is set which in essence aborts any attempt at scoring or use of this prediction.

However, as indicated by step 41, if it is a valid play prediction, step 42 asks if the play number which was actually used has been received via the FM receiver. When received, the play number is gotten in step 43. Of course, it is ultimately compared with the play number that the user or player has predicted.

The other scoring information is "degree of difficulty". This is utilized as indicated in block 44 to assign an ultimate score value. Specifically, a play table 46 which is part of the memory 26 has all of the various play numbers; for example, 54 are illustrated with various score points or base values for the plays. After the play has occurred, a referee or panel of experts or other similar technique assigns a degree of difficulty to this play. As indicated in block 44, this degree of difficulty is multiplied by the base value and this is transmitted to the get score value block 47 for the ultimate score on that play.

More specifically, degree of difficulty is assigned so that non-obvious calls would be worth higher scores than obvious calls. For example, if the ball was on the one yard line, first and ten, in the possession of the Washington Redskins, and most people predict a fullback plunge but the play was actually a quarterback roll-out, the degree of difficulty for a correct prediction of a play of this type would be significantly higher. This degree of difficulty might be assigned by an expert referee at the game operation center. It can, in accordance with a preferred embodiment, be achieved by summarizing the predictions of a panel of sample players and determining how unobvious an actual prediction is. For example, if 90 people out of a 100 predict a certain play and only 10 predict the proper play, then the number of points would be significantly higher than if 90 of 100 predicted correctly.

Returning again to the specific flow chart of FIG. 3, after the score value computation which is stored by means of step 47, in step 48 the question is asked did this particular player have the correct play. If no, start is returned to; if yes, this is added in step 51 to the player's previous score and typically displayed at 22 on the game console 11 as illustrated in FIG. 1. The total scores would be stored permanently in the memory 26 for each quarter and the total game's score (with respect to the success in degree of prediction) is stored. Then, the user by activating the modem 29 (FIG. 2) would provide a download to the central computer via their home telephone line. As will be discussed later, because of the verification and authentication provisions of the present invention, this can be done at any time including several hours after the game is over. Thus, assuming hundreds of thousands of persons are playing this particular game as might be true, for example, with the World Football Championship communication lines would not be overloaded. And it should also be emphasized that mass communication techniques such as television and an FM SCA receiver are being utilized for control and information purposes. Thus, the game of the present invention allows a large number of game participants in a very economical and non-burdensome manner from a communication's standpoint.

The technique of providing data on an SCA FM receiver and manipulating it is described in a co-pending application in the name of the present inventor and assigned to the present assignee, entitled METHOD OF ENCODING STOCK MARKET DATA AND TRANSMITTING BY RADIO TO A PLURALITY OF RECEIVERS, filed Apr. 10, 1984, Ser. No. 598,694. However, other mass communication techniques could be utilized including in a cable television system utilizing cable itself for this information, utilizing the subcarrier of an AM type radio station, or utilizing television subcarrier techniques such as data information which is inserted during horizontal retrace intervals or between frames of the television picture.

Thus far, what has been described in FIGS. 2 and 3, all takes place at the participant's remote location. FIG. 4 illustrates the central location which would be near where the sporting event is being held or at any convenient central location that would have a central computer. At the beginning of the event, which is to be utilized for the game, there would be a referee which would input the various information indicated in block 52. That is, on the snap of the ball, this would be signaled to be transmitted via transmitter 52 to all the FM receivers along with the time indication. And then after the play occurred, the play number along with its degree of difficulty would be transmitted via the FM transmitter 53 as discussed above. The snap time transmission prevents or renders ineffectual any participant entering a prediction after the occurrence or determination of the variable of the particular event such as the football play.

From an authentication and verification point of view, there is transmitted at random times counter start signals as indicated by the line 54 which activates the FM transmitter 53. In addition, the line 56 also carries the start signals which sets up a table of elapsed times for the participant's counters (FIG. 2). Thus, block 59 could be part of a computer or handwired digital logic including ten counters to duplicate the contents of the participants' counters. These times are compared to the actual counter contents as shown by step 57, and if a comparison is not made so there is a lack of verification, the received score is rejected. If accepted, then this is recorded as illustrated by step 58 in conjunction with the user I.D. number for later use.

When the remote participant desires to download via the telephone line various information, this is indicated by the step 60 which receives the scoring information from the telephone line interconnection 61, checks as illustrated by step 61 the I.D. and password, and then receives the various counts (step 62) of the counters as they existed during the downloading time. In other words, these counts will be the elapsed time since the start signal for that particular counter was initiated. Therefore, the table of elapsed times for the 10 counters as illustrated should be exactly identical to the contents of the counters of the participant at the time the participant has telephoned.

FIG. 5 illustrates in the left-hand column the 10 counter numbers and the times when start signals were sent out on the line 54 illustrated in FIG. 4. These same start signals initiated the counters in the elapsed timetable 59 and thus as indicated in the right-hand column when the remote participant telephones at 8:00 P.M. the counter No. 1 which was started at 11:00 A.M. that morning should now read 9:00 hours. And the remaining counters, 2 through 10, which were started later by the randomly in time transmitted start signals should read correspondingly lesser hours as shown. Thus, the actual contents of the table 59 at the time of the downloading of the remote participant are compared in step 57 (FIG. 4) and if a comparison is made, allowing for various timing shifts caused by the downloading, then this score is recorded as indicated in step 58. However, since the receive counts step 57 can simultaneously stop or read out the counters of Table 59, the accuracy of comparison may be tenths of a second or less. Thus, with regard to the foregoing feature, the counter start signals are a form of authentication coding, and each remote participant, by the 10 counters included in their remote unit, sets up a verification code and when these are finally downloaded a final verification takes place.

In general, after the event has been completed and all scores have been downloaded (perhaps a cutoff time would be provided), all of the game participants are rated and they are advised as to their relative performances.

Thus, in summary, an improved remote gaming program system has been provided which effectively uses mass communication techniques to provide a simple, economical and foolproof operation.

What is claimed is:

1. A game of skill playable by several remote participants in conjunction with a live event comprising:
   first mass communications means for communicating said live event to said remote participants;
   processing means including data storage means associated with each participant for accepting from said participant at least one prediction as to a future variable of said event and for storing all predictions over substantially the life of said event;
   second mass communications means connected to said processing means substantially during said life of said event, said processing means being responsive to a signal transmitted by said second mass communications means from a central location for rendering ineffectual said participant's prediction if stored after the occurrence or determination of said variable of said event; and
   a telephone line coupled to said storage means which is responsive to said processing means for downloading, during a single very short time interval relative to said life of said event, contents of said data storage means to said central location.

2. A game as in claim 1 where said first mass communications means includes television receivers and said second mass communications means includes FM receivers including means for receiving the SCA portion of an FM channel.

3. A game as in claim 1 where said second mass communications means transmits said variable after its occurrence and said processing means is responsive to said transmitted variable for scoring said prediction and storing the score in said data storage means.

4. A game as in claim 3 including display means associated with said participant for displaying said score.

5. A game as in claim 1 where said second communications means transmits from said central location an authentication coding, said processing means being responsive to said authentication coding to provide a verification code, said verification code being downloaded via said telephone line and including means at said central location for checking said verification code.

6. A game as in claim 5 where said processing means responsive to said authentication coding includes a plurality of counters individually started at random times by such coding, the counter contents being said verification code.

7. A game as in claim 6 including counter means at said central location responsive to said authentication coding for duplicating said contents of said remote counters and where said checking means includes means for comparing such contents with said downloaded counter contents.

* * * * *